(12) United States Patent
Bender

(10) Patent No.: US 9,514,171 B2
(45) Date of Patent: Dec. 6, 2016

(54) MANAGING DATABASE CLUSTERING INDICES

(71) Applicant: International Business Machines Corporation, Armonk, NY (US)

(72) Inventor: Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 14/177,759

(22) Filed: Feb. 11, 2014

(65) Prior Publication Data

US 2015/0227561 A1 Aug. 13, 2015

(51) Int. Cl.
G06F 17/30 (2006.01)

(52) U.S. Cl.
CPC .............................. G06F 17/30327 (2013.01)

(58) Field of Classification Search
CPC .................................................. G06F 17/30563
See application file for complete search history.

(56) References Cited

U.S. PATENT DOCUMENTS

| 2008/0133493 | A1 | 6/2008 | Bender | |
|---|---|---|---|---|
| 2011/0276789 | A1* | 11/2011 | Chambers | G06F 9/45533 712/220 |
| 2012/0016835 | A1 | 1/2012 | Singh et al. | |
| 2012/0124518 | A1* | 5/2012 | Stawitz | G06F 9/45512 715/810 |
| 2012/0310875 | A1 | 12/2012 | Prahlad et al. | |
| 2013/0047161 | A1* | 2/2013 | Simitsis | G06F 9/5027 718/100 |
| 2013/0332484 | A1* | 12/2013 | Gajic | G06F 17/30286 707/770 |
| 2015/0006468 | A1* | 1/2015 | Duan | G06F 17/30345 707/602 |

OTHER PUBLICATIONS

Centeno, M. et al., "Oracle9i Real Application Clusters and PolyServe Matrix Server on IBM server Eserver, xSeries and BladeCenter", Redpaper, First Edition (Nov. 2004). This edition applies to Oracle9i Real Application Clusters 9.2.0.3, PolyServe Matrix Server 1.2.1, Suse Linux Enterprise Server 8 and Red Hat Enterprise Linux As 2.1. <ibm.com/redbooks>. Copyright International Business Machines Corporation 2004.
"System and Methods to Dynamically create ETL processes, execute them remotely and consume its report in alternate process(es)", Authors Disclosed Anonymously, IP.com Prior Art Database, IPCOM000222901D, Oct. 29, 2012.

(Continued)

*Primary Examiner* — Khanh Pham
(74) *Attorney, Agent, or Firm* — John W. Hayes; William H. Hartwell

(57) ABSTRACT

A computer manages entries into a clustered index. The computer handles one or more commands, wherein each command loads a dataset into a database. The computer queries a database system catalog of the database for a target index, wherein the database system catalog contains a list of indices of the dataset in the form of metadata. The computer disables a parallel loading process for the dataset. The computer loads the dataset into the target index, wherein the dataset is sorted according to the target index.

14 Claims, 5 Drawing Sheets

(56) References Cited

OTHER PUBLICATIONS

Xue, H. et al, "Study and Realization of Supermarket BI System Based on Data Warehouse and Web Technique", 2008 International Conference on Computer Science and Software Engineering, pp. 482-485.

Xue, H. et al, "Study and Realization of Supplier Business Intelligence System for Chain Supermarket", Published in: International Conference on Computational Intelligence and Software Engineering, 2009, CiSE 2009. Dec. 11-13, 2009. DOI:10.1109/CISE.2009.5366538.

* cited by examiner

MANAGING DATABASE CLUSTERING INDICES

BACKGROUND

Extract Transform Load (ETL) refers to a process in database usage, more specifically in data warehousing, performed by an ETL tool. The process includes extracting data from an outside source, transforming the data to fit operational needs, and loading the transformed data into an end target (e.g., database or database warehouse). Typically, ETL tools read data from source systems, transform the data, and store frequently used data in what is called a dataset. An ETL process typically consists of numerous ETL jobs which the ETL tool sequences together. Subsequent to the data being transformed, the dataset is indexed and loaded in the end target. The end target, typically a relational database, utilizes cluster indexing in organizing the data to reduce the magnitude of the index. The relational database often is capable of receiving structured query language (SQL) queries for data and satisfying the queries utilizing the clustered index to obtain the data in the indexed datasets.

Currently, when a dataset is being loaded into the end target, an ETL developer would have to manually add a sort to the ETL code to have it match the clustering index of the end target. Typically, parallel processing is utilized by the ETL tool to load the dataset into the end target, which can affect the consistency of the dataset, since all aspects of the process have to be synchronized.

SUMMARY

Embodiments of the present invention disclose a method, computer program product and computer system for managing entries into a clustered index. In an embodiment, a computer implemented method for managing entries into a cluster index comprises handling, by one or more processors, one or more commands, wherein each command loads a dataset into a database; querying, by one or more processors, a database system catalog of the database for a target index, wherein the database system catalog contains a list of indices of the dataset in the form of metadata; disabling, by one or more processors, a parallel loading process for the dataset; and loading, by one or more processors, the dataset into the target index, wherein the dataset is sorted according to the target index.

DETAILED DESCRIPTION

Figure 1:
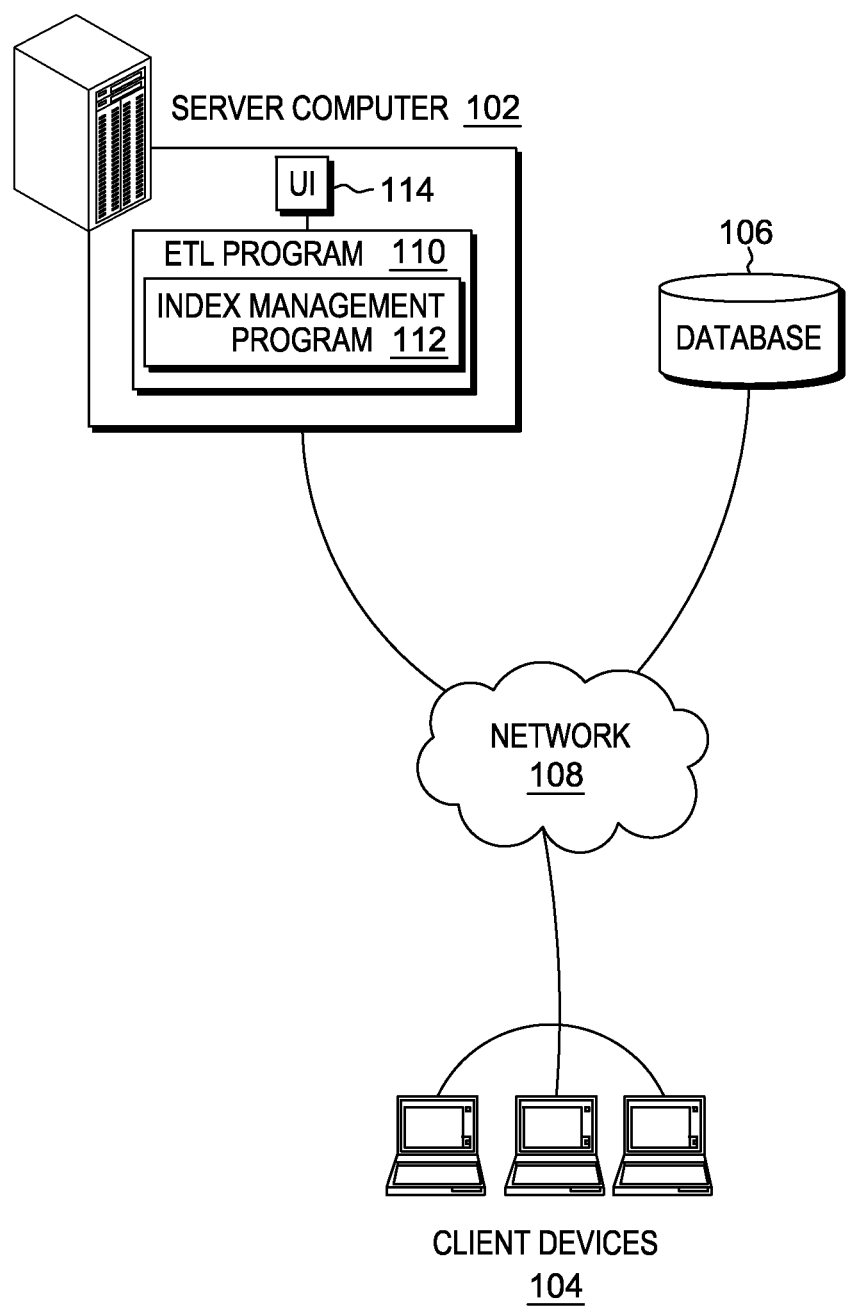
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, client devices 104, and database 106 interconnected over network 108.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

Extract Transform and Load (ETL) program 110 residing in server computer 102 has the ability to receive datasets from client devices 104, transform the datasets, and load the transformed datasets into an end target, such as, database 106 or a file system not illustrated in FIG. 1. ETL program 110 may comprise programs or tools such as index management program 112. In this embodiment, ETL program 110 communicates with index management program 112 residing in server computer 102.

Index management program 112 has the ability to optimize the loading of transformed datasets into a target index of the end target. Index management program 112 can query a database system catalog of database 106 to obtain a target index for the transformed dataset, and disable parallel loading process for the transformed dataset. Index management program 112 can sort the transformed dataset appropriately and load the dataset into the target index. For each transformed dataset, index management program 112 has the ability to query a user through user interface 114 to determine whether or not to utilize the optimization loading of the transformed dataset into the target index.

In general, network 108 can be any combination of connections and protocols that will support communications between server computer 102, client devices 104 and database 106. Network 108 can include, for example, a local area network (LAN), a wide area network (WAN) such as the internet, a cellular network, or any combination of the preceding, and can further include wired, wireless, and/or fiber optic connections.

In one embodiment, ETL program 110 and index management program 112 can be a web service accessible via network 108 to a user of a separate device. In another embodiment, ETL program 110 and index management program 112 may be operated directly by a user of server computer 102.

In various embodiments of the present invention, client devices 104 can be a laptop computer, a tablet computer, a netbook computer, a personal computer (PC), a desktop computer, a personal digital assistant (PDA), a smartphone, or any programmable electronic device capable of communicating with server computer 102 and database 106 via network 108.

Database 106 can store content of index management program 112 such as, file systems containing indices, key value entries for each index, and file locations for each key value entry of each index. Database 106 can also store any datasets that ETL index program 110 transforms and indexes. Database 106 can also be located on server computer 102.

User interface (UI) 114 on server computer 102 displays information that any one of the processes of ETL program 110 or index management program 112 may display to a user. User interface 114 can be, for example, a graphical user interface (GUI) or a web user interface (WUI) that displays text, documents, web browser windows, user options, application interfaces and instructions for operation. User interface 114 also has the ability to receive user inputs for both ETL program 110 and index management program 112.

Figure 2:
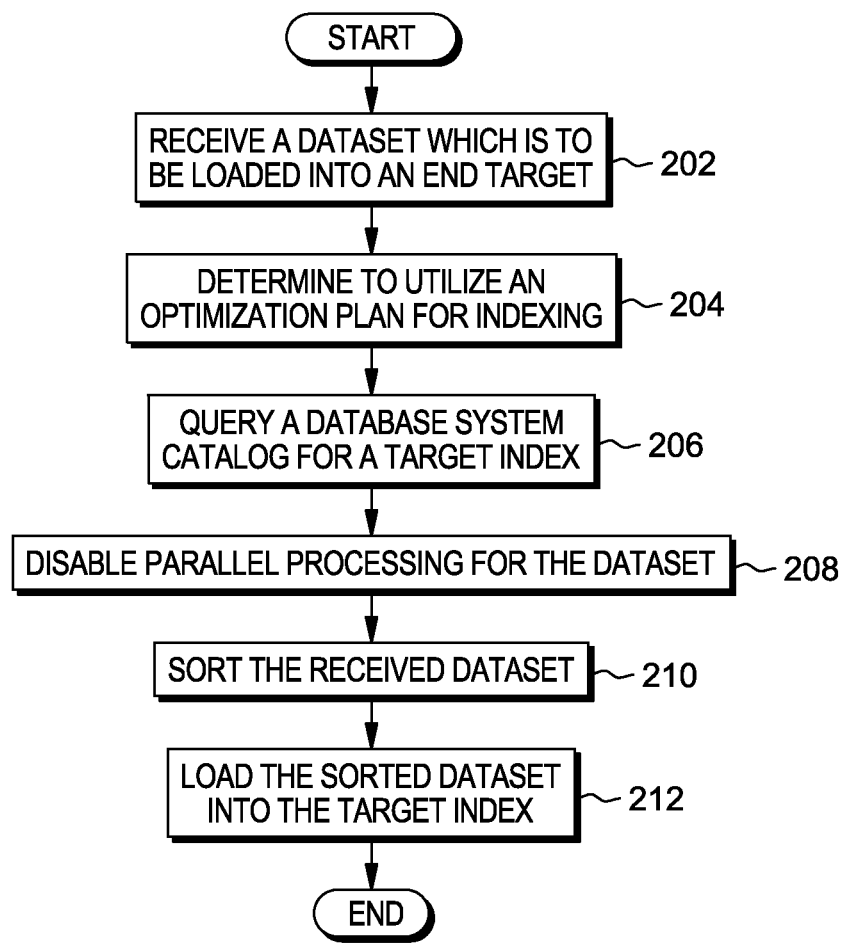
FIG. 2 is a flowchart depicting operational steps of an index management program for creating an index entry for datasets stored in a file system, in accordance with an embodiment of the present invention.

FIG. 2 is a flowchart depicting operational steps of an index management program for creating an index entry for datasets stored in a file system, in accordance with an embodiment of the present invention.

Index management program 112 receives a dataset which is to be loaded into an end target (step 202). In one embodiment, subsequent to the dataset being transformed during an ETL process, index management program 112 receives the dataset from ETL program 110. Prior to the received dataset being loaded into the end target, index management program 112 creates an index entry for the received dataset. In this embodiment, the end target is database 106, where the database includes a database management system. The database management system contains a database system catalog with metadata containing table pointers and index pointers to tables and indices located within the database management system. Index management program 112 is capable of querying the database management system to obtain target index information in the form of metadata.

Index management program 112 determines to utilize an optimization plan for indexing (step 204). In this embodiment, index management program 112 queries a user of index management program 112 through user interface 114, for each received dataset, to determine whether or not to utilize the optimization plan for loading datasets into the target index. Index management program 112 receives a selection from the user to utilize the optimization plan, therefore eliminating the parallel processing for the received dataset. In another embodiment, index management program 112 determines to utilize the optimization plan for each received dataset based on a received user preference, rather than querying the user for each received dataset to determine whether or not to utilize the optimization plan.

In another embodiment, index management program 112 utilizes a threshold level, where the threshold level is storage size of a dataset. If the dataset is larger than the threshold level storage size, index management program 112 determines to utilize the optimization plan for loading the dataset into the target index. If the dataset is smaller than the threshold level storage size, index management program 112 determines to proceed utilizing the parallel processing method for loading the dataset into the target index. A user of index management program 112 can program the threshold level for the storage size of a dataset and index management program 112 can store the threshold level as a preference.

Index management program 112 queries a database system catalog for a target index (step 206). In this embodiment, the target index is a clustered index which index management program 112 is maintaining. As previously mentioned, the database management system of database 106 contains the database system catalog, where the database system catalog contains table pointers to tables as well as index pointer to indices. Index management program 112 utilizes structured query language (SQL) to read the database system catalog to obtain the target index and more specifically, particular columns in the target index. In this embodiment, index management program 112 identifies a column of the target index for a dataset with one sort. In another embodiment, index management program 112 identifies multiple columns of the target index for a dataset with multiple sorts. Index management program 112 receives the identified one or more columns of the target index in the form of metadata.

Index management program 112 disables parallel processing for the dataset (step 208). Parallel processing sorts the dataset but inserts the sorted dataset into various columns of the target dataset, eliminating the clustered index structure of the target index. By disabling the parallel processing, index management program 112 loads a sort of the dataset into the target index without affecting the clustered index structure of the target index.

Index management program 112 sorts the received dataset (step 210). Index management program 112 sorts the received dataset according to the identified one or more columns of the target index, so that each sort of the dataset is loaded into a respective column of the target index. Index management program 112 sorts the dataset such that the sorted dataset can be loaded into the correct columns and rows of the target index. One skilled in the art would recognize index management program 112 can utilize known methods to sort the received dataset.

Index management program 112 loads the sorted dataset into the target index (step 212). Subsequent to sorting the received dataset, index management program 112 loads the sorted dataset into the database. Index management program 112 loads the dataset utilizing a single loader rather than multiple loaders during a parallel process, which sorts and loads datasets randomly.

Figure 3A:
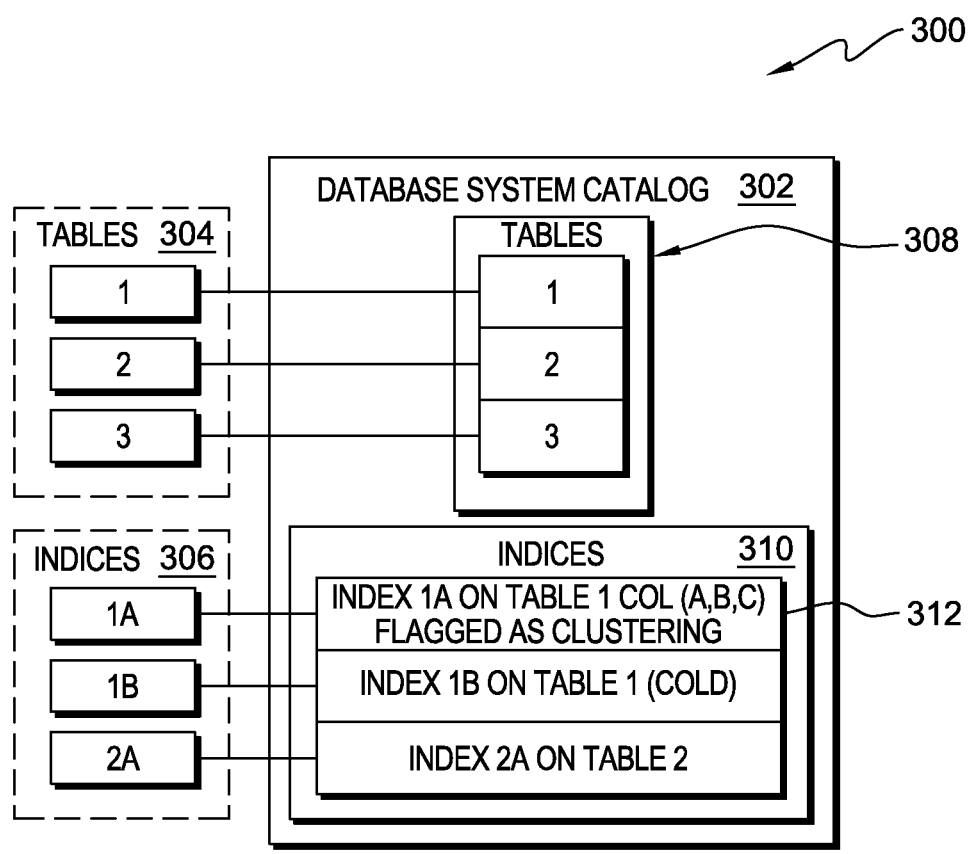
FIG. 3A is a functional block diagram illustrating a database management system, in accordance with one embodiment of the present invention.

FIG. 3A is a functional block diagram illustrating a database management system, in accordance with one embodiment of the present invention.

In this embodiment, index management program 112 utilizes SQL to query a database system catalog (i.e., system catalog 302) for a target index, as previously discussed in step 206 (FIG. 2). Database management system 300 includes database system catalog 302, tables 304, and indices 306. In one embodiment, tables 304 and indices 306 are located in a single database associated with database management system 300. In another embodiment, tables 304 and indices 306 are located in multiple databases associated with database management system 300. Index management program 112 receives the data, which resides in tables 304, from multiple systems which are associated with database management system 300. Database system catalog 302 contains table pointers 308 and index pointers 310, where index pointers 310 have accompanying descriptions for each index. Each table pointer of table pointers 308 is associated with each respective table of tables 304. Similarly, each index pointer of index pointers 310 is associated with each respective index of indices 306. Example index pointer 312 is one of index pointers 310 and the composition of example index pointer 312 is discussed in further detail with respect to FIG. 3B.

Index management program 112 queries database system catalog 302, as previously mentioned in the discussion of step 206, for a location in a target index. In this example, example index pointer 312 points to the target index where index management program 112 is to load a sorted dataset.

Index management program 112 can receive information within example index pointer 312 in the form of metadata. The information can include columns and rows where index management program 112 is to load the dataset.

Figure 3B:
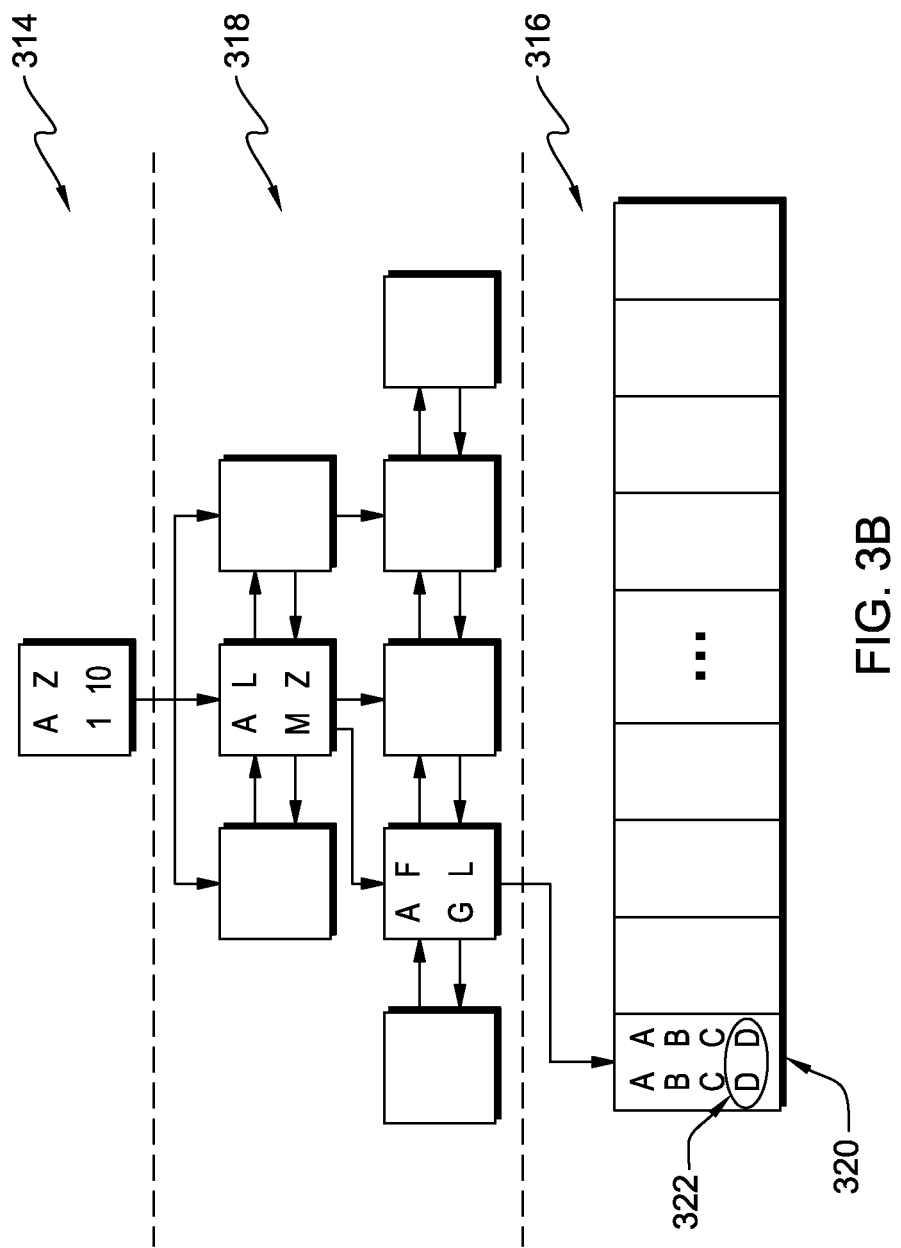
FIG. 3B is a functional block diagram illustrating a database table organized by clustered index, in accordance with one embodiment of the present invention.

FIG. 3B is a functional block diagram illustrating a database table organized by clustered index, in accordance with one embodiment of the present invention.

In this embodiment, example index pointer 312 is a clustered index organized as a B-Tree, where each page of the index is called an index node. Example index pointer 312 includes root node 314, leaf nodes 316, and intermediate nodes 318. Root node 314 represents the top node of the B-Tree and leaf nodes 316 represent the bottom nodes of the B-Tree. Leaf nodes 316 represent the physical location of the data depicted in a page chain. Intermediate nodes 318 represent any index levels between root node 314 and leaf nodes 316. In this clustered index, leaf nodes 316 contain data page 320 with data row 322 of the underlying table. Data row 322 is a location within the target index where index management program 112 is to load the dataset.

Figure 4:
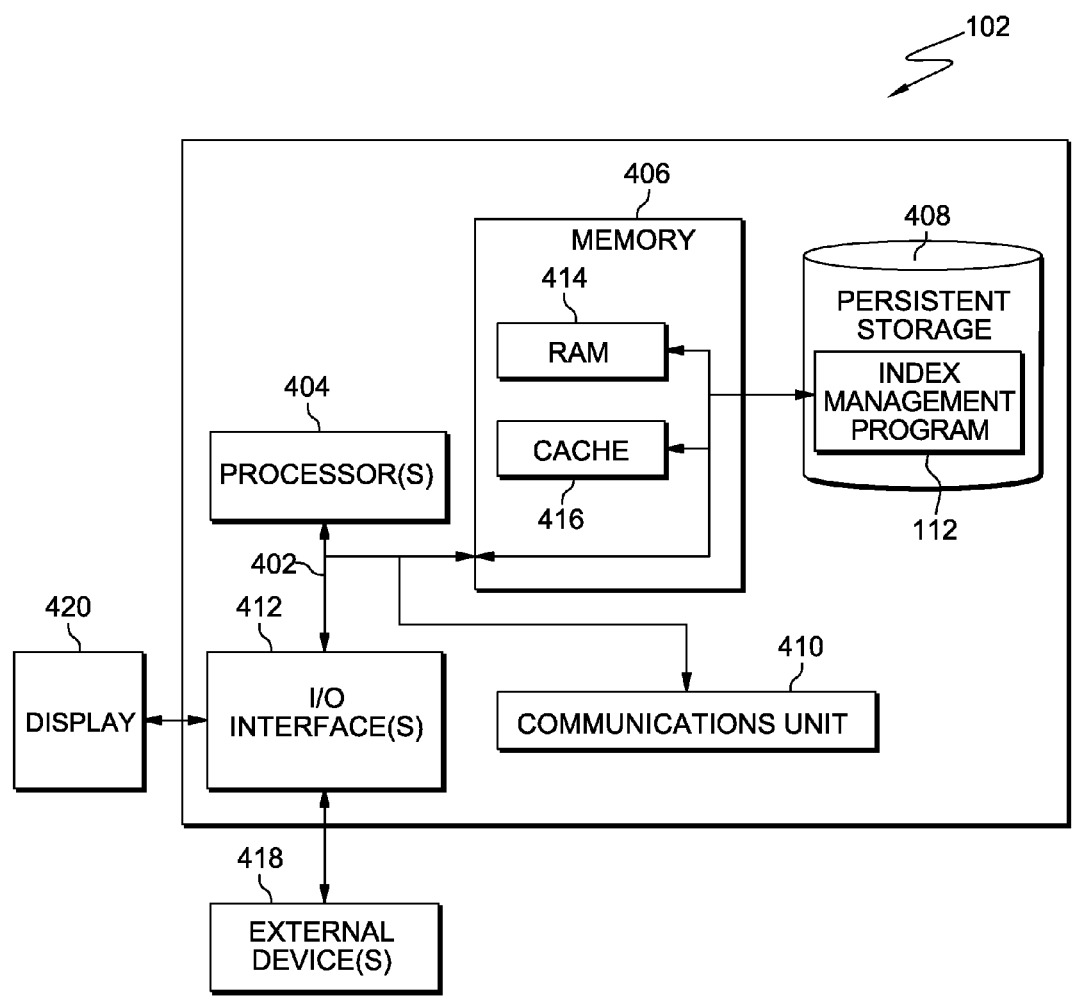
FIG. 4 is a block diagram of components of a computer system, such as the computer server of FIG. 1, in accordance with an embodiment of the present invention.

FIG. 4 depicts a block diagram of components of a computer, such as server computer 102, hosting index management program 112 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage medium.

Index management program 112 is stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by server computer 102. In these examples, communications unit 410 includes one or more wireless network interface cards. Communications unit 410 may provide communications through the use of either or both physical and wireless communications links. Computer programs and processes, such as index management program 112, may be downloaded to persistent storage 408 through communications unit 410, or uploaded to another system through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420. Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing entries into a clustered index, the method comprising:
   a computer handling, by one or more processors, one or more commands, wherein each command loads a dataset into a database;
   the computer receiving, by one or more processors, a first dataset to load into the database;
   responsive to determining a first storage size for the first dataset exceeds a storage size threshold value, the computer identifying, by one or more processors, the first dataset for indexing utilizing an optimization plan, wherein the optimization plan disables a parallel load process for loading the first dataset into a target index;
   the computer querying, by one or more processors, a user through a user interface on the computer, to determine to disable the parallel load process for loading the first dataset into the target index and allow for sequential loading of the first dataset;
   responsive to receiving a selection from the user to disable the parallel load process for loading the first dataset into a target index, the computer querying, by one or more processors, a database system catalog of the database for the target index, wherein the database system catalog contains a list of indices of the first dataset in the form of metadata;
   the computer disabling, by one or more processors, a parallel loading process for the first dataset; and
   the computer loading, by one or more processors, the first dataset into the target index as a single load process, wherein the dataset is sorted according to the target index.

2. The method of claim 1, further comprising:
   the computer receiving, by one or more processors, metadata specifying at least one location in the target index.

3. The method of claim 1, wherein querying a database system catalog of the database for a target index comprises:
   the computer sending, by one or more processors, a Structured Query Language (SQL) request to obtain at least one location in the target index from the database system catalog.

4. The method of claim 3, wherein the at least one location in the target index includes at least one column in the target index.

5. The method of claim 4, wherein the target index is a clustered index.

6. A computer program product for managing entries into a clustered index, the computer program product comprising:
one or more computer readable tangible storage media and program instructions stored on at least one of the one or more storage media, the program instructions comprising:
program instructions to handle, one or more commands, wherein each command loads a dataset into a database;
program instructions to receive a first dataset to load into the database;
program instructions to, responsive to determining a first storage size for the first dataset exceeds a storage size threshold value, identify the first dataset for indexing utilizing an optimization plan, wherein the optimization plan disables a parallel load process for loading the first dataset into a target index;
program instructions to query a user through a user interface on the computer, to determine to disable the parallel load process for loading the first dataset into the target index and allow for sequential loading of the first dataset;
program instructions to, responsive to receiving a selection from the user to disable the parallel load process for loading the first dataset into a target index, query a database system catalog of the database for the target index, wherein the database system catalog contains a list of indices of the first dataset in the form of metadata;
program instructions to disable a parallel loading process for the first dataset; and
program instructions to load the first dataset into the target index as a single load process, wherein the dataset is sorted according to the target index.

7. The computer program product of claim 6, further comprising program instructions stored on the one or more computer readable storage media, which when executed by a processor, cause the processor to:
receive metadata specifying at least one location in the target index.

8. The computer program product of claim 6, wherein querying a database system catalog of the database for a target index comprises program instructions stored on the one or more computer readable storage media, which when executed by a processor, cause the processor to:
send a Structured Query Language (SQL) request to obtain at least one location in the target index from the database system catalog.

9. The computer program product of claim 8, wherein the at least one location in the target index includes at least one column in the target index.

10. The computer program product of claim 9, wherein the target index is a clustered index.

11. A computer system for managing entries into a clustered index, the computer system comprising:
one or more computer processors;
one or more computer readable storage media; and
program instructions stored on the computer readable storage media for execution by at least one of the one or more computer processors, the program instructions comprising:
program instructions to handle, one or more commands, wherein each command loads a dataset into a database;
program instructions to receive a first dataset to load into the database;
program instructions to, responsive to determining a first storage size for the first dataset exceeds a storage size threshold value, identify the first dataset for indexing utilizing an optimization plan, wherein the optimization plan disables a parallel load process for loading the first dataset into a target index;
program instructions to query a user through a user interface on the computer, to determine to disable the parallel load process for loading the first dataset into the target index and allow for sequential loading of the first dataset;
program instructions to, responsive to receiving a selection from the user to disable the parallel load process for loading the first dataset into a target index, query a database system catalog of the database for the target index, wherein the database system catalog contains a list of indices of the first dataset in the form of metadata;
program instructions to disable a parallel loading process for the first dataset; and
program instructions to load the first dataset into the target index as a single load process, wherein the dataset is sorted according to the target index.

12. The computer system of claim 11, further comprising program instructions stored on the one or more computer readable storage media, which when executed by a processor, cause the processor to:
receive metadata specifying at least one location in the target index.

13. The computer system of claim 11, wherein querying a database system catalog of the database for a target index comprises program instructions stored on the one or more computer readable storage media, which when executed by a processor, cause the processor to:
send a Structured Query Language (SQL) request to obtain at least one location in the target index from the database system catalog.

14. The computer system of claim 13, wherein the at least one location in the target index includes at least one column in the target index.

* * * * *